US006781928B2

(12) United States Patent
Iwata et al.

(10) Patent No.: US 6,781,928 B2
(45) Date of Patent: Aug. 24, 2004

(54) OPTICAL HEAD AND OPTICAL DISK APPARATUS

(75) Inventors: Katsuo Iwata, Tokyo (JP); Maho Kuwahara, Tokyo (JP); Shintaro Takehara, Yokohama (JP); Sumitaka Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 09/987,724

(22) Filed: Nov. 15, 2001

(65) Prior Publication Data

US 2003/0063529 A1 Apr. 3, 2003

(30) Foreign Application Priority Data

Jul. 27, 2001 (JP) ........................................ 2001-228064

(51) Int. Cl.[7] .................................................. G11B 7/00
(52) U.S. Cl. ................................ 369/44.23; 369/112.2; 369/112.23; 369/112.26
(58) Field of Search .......................... 369/44.11, 44.12, 369/44.14, 44.23, 44.25, 44.27, 44.28, 112.01, 112.08, 112.13, 112.2, 112.23, 112.24, 112.26

(56) References Cited

U.S. PATENT DOCUMENTS

| 5,247,503 A | * | 9/1993 | Nomiyama et al. ...... 369/44.35 |
| 6,396,775 B1 | * | 5/2002 | Nakajima ................ 369/13.13 |

FOREIGN PATENT DOCUMENTS

| JP | 6-215407 | 8/1994 |
| JP | 11-195229 | 7/1999 |
| JP | 11-259893 | 9/1999 |
| JP | 11-259894 | 9/1999 |
| JP | 11-259906 | 9/1999 |
| JP | 2001-84626 | 3/2001 |
| JP | 2001-307370 | 11/2001 |
| JP | 2002-170274 | 6/2002 |

OTHER PUBLICATIONS

"Spherical Aberration Detection for HD/DVD Optical Pickups", Takeshi Shimano, Mariko Umeda, Tetsuo Ariyoshi, Hitachi Ltd., Tokyo, Japan; pp. 242, 243.

* cited by examiner

Primary Examiner—Muhammad Edun
(74) Attorney, Agent, or Firm—Pillsbury Winthrop LLP (57) ABSTRACT

There are comprised a laser light source for outputting a light beam, an optical disk having a recording/reproducing surface and a transparent substrate on the surface, an objective lens for gathering the light beam on the optical disk, a relay lens system comprising one or more lenses inserted between the laser light source and the objective lens, means for moving one or more lenses in the relay lens system toward its optical axis so as to correct sphere aberration in accordance with a thickness of the transparent substrate of the optical disk, and means for sustaining a diameter of an incident light on the objective lens when one or more lenses among the relay lenses move.

15 Claims, 8 Drawing Sheets

(12) United States Patent

OPTICAL HEAD AND OPTICAL DISK APPARATUS

CROSS-REFERENCE TO RELATED APPLICATIONS

This application is based upon and claims the benefit of priority from the prior Japanese Patent Application No. 2001-228064, filed Jul. 27, 2001, the entire contents of which are incorporated herein by reference.

BACKGROUND OF THE INVENTION

1. Field of the Invention

The present invention relates to an optical head and an optical disk apparatus for recording or reproducing information on an optical disk in which a sphere aberration correcting method is particularly improved.

2. Description of the Related Art

There have been techniques for correcting sphere aberration generated on the optical head due to a thickness error of an optical disk substrate so that a utility efficiency of light is improved. This sort of technique is disclosed in, for example, Japanese Patent Application KOKAI Publication Nos. 11-259906, 11-195229, 06-215407, and 11-259894.

The sphere aberration correcting methods according to the conventional techniques are realized by moving a relay lens. However, in these years where information recorded on a disk has been densified refining a beam spot, the techniques that corrects the sphere aberration by only moving the relay lens become insufficient and more improvement has been expected.

BRIEF SUMMARY OF THE INVENTION

Here, an object of the embodiments are to provide an optical head and an optical disk apparatus in which, by adding a limitation to a structure of a relay lens and an objective lens, even when the relay lens is moved in order to correct sphere aberration generated due to a thickness error of an optical disk substrate, a beam diameter being incident on an objective lens does not change.

In order to attain this object, an embodiment comprises a laser light source for outputting a light beam, an optical disk having a recording/reproducing surface and a transparent substrate on the surface, an objective lens for gathering the light beam to the optical disk, a relay lens system comprising one or more lenses inserted between the laser light source and the objective lens, means for moving one or more lenses in the relay lens system toward its optical axis so as to correct the sphere aberration in accordance with a thickness of the transparent substrate of the optical disk, and means for sustaining a diameter of the incident light on the objective lens when one or more lenses in the relay lens system are moved.

Additional objects and advantages will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, preferred embodiments of the present invention will be explained with reference to the accompanied drawings.

Figure 1:
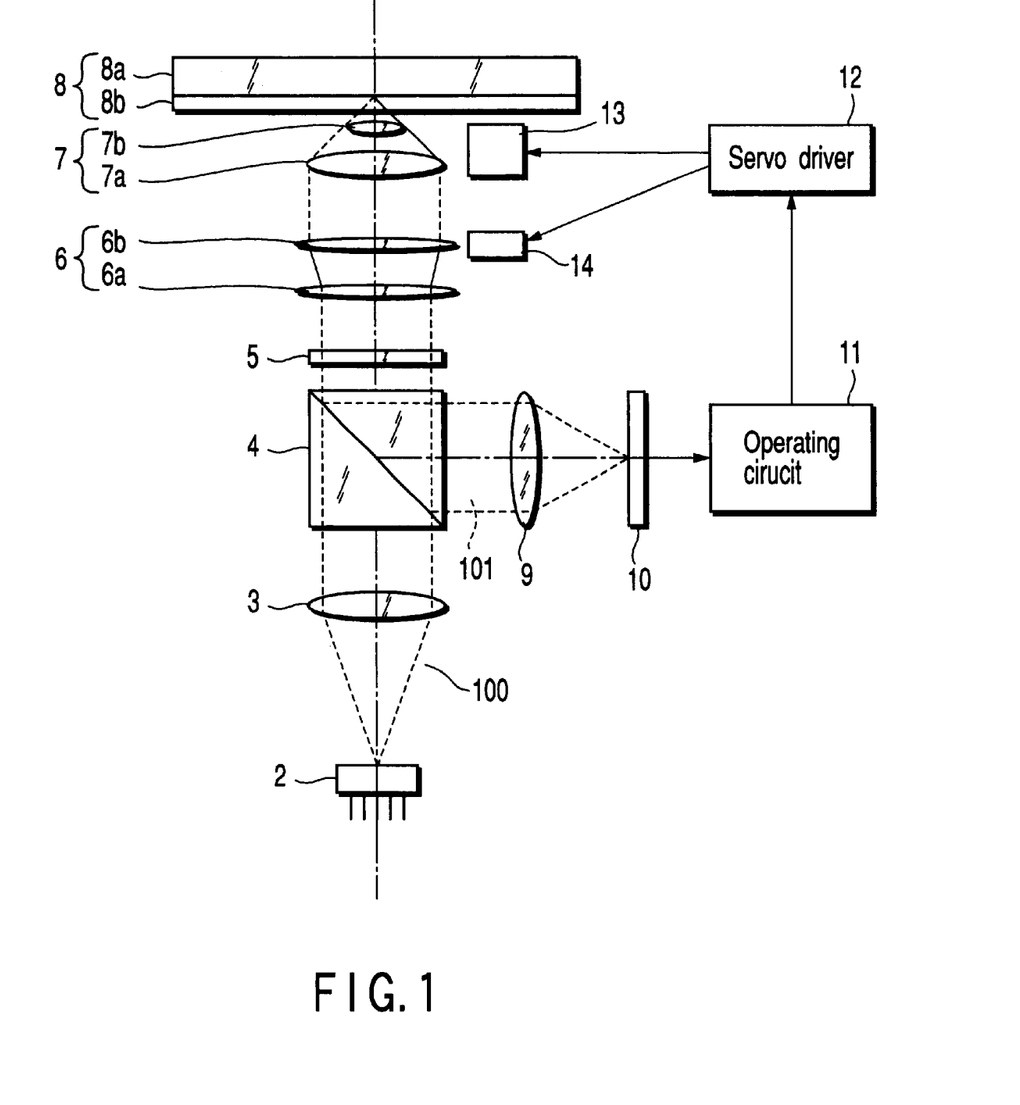
FIG. 1 is an explanatory drawing of a basic structure of an optical head according to a first embodiment of the present invention.

FIG. 1 shows a main structure of an optical head according to a first embodiment of the present invention. An output light 100 from a semiconductor laser light source 2 becomes a parallel light through a collimate lens 3 and permeates a polarized beam splitter 4 and a λ/4 plate 5.

The light that permeated the λ/4 plate 5 further permeates a relay lens system 6, and then becomes incident on an objective lens 7. The light outputted from the objective lens 7 permeates a transparent substrate 8b of an optical disk 8, and is gathered on a recording/reproducing surface 8a.

A reflection light 101 from the recording/reproducing surface 8a of the optical disk 8 re-permeates the transparent substrate 8b of the optical disk 8, and permeates the objective lens 7, the relay lens system 6, and the λ/4 plate 5. The reflected light 101 that permeated the λ/4 plate 5 is reflected on the polarized beam splitter 4, permeates a light detection system 9, and becomes incident on a light detector 10.

A light-receiving portion of the light detector 10 is divided into plural parts, and each of divided areas of the light-receiving portion outputs a current according to a light intensity. The outputted current is led to an operating circuit 11 after being converted into a voltage by using a current/voltage (I/V) amplifier. The operating circuit 11 generates a high-frequency (HF) signal, a focus error signal, a track error signal and the like by an operating process using an input signal.

Here, the relay lens system 6 comprises a bottom lens 6a and a top lens 6b arranged on an optical axis, and the top lens 6a or the bottom lens 6b can be movement-controlled in the optical axis direction. A driving portion 14 executes the movement control of the lenses.

The relay lens system 6 is designed so that, when a thickness of the transparent substrate 8b is equal to a specified value (for example, 100 ($\mu$m)), the light from the relay lens system 6 is designated so as to be incident on the objective lens 7 as a substantially parallel light.

Here, when the thickness of the transparent substrate 8b is not equal to the specified value, sphere aberration due to a thickness error of the transparent substrate 8b is generated. Under the circumstance, a light-gathering spot shape on the recording/reproducing surface 8b of the optical disk 8 is distorted so that stable and accurate recording and reproduction become difficult. On the other hand, the sphere aberration is generated by making the incident light on the objective lens 7 into a convergence light or a divergence light. Moreover, the incident light on the objective lens 7 can be made into the convergence light or the divergence light by moving, for example, the top lens 6b in the relay lens system 6 in the optical axis direction.

Here, by making the incident light on the objective lens 7 into the convergence light or the divergence light by moving the top lens 6b in the relay lens system 6 in the optical axis direction in accordance with an quantity of the thickness error of the transparent substrate 8b, the sphere aberration generated due to the thickness error of the transparent substrate 8b can be corrected.

Concretely, when the transparent substrate 8b is thicker than the specified value, it is sufficient that the top lens 6b in the relay lens system 6 is moved in the optical axis direction in accordance with the quantity of the thickness error of the transparent substrate 8b so that the incident light on the objective lens 7 becomes the divergence light. Moreover, when the transparent substrate 8b is thinner than the specified value, it is sufficient that the top lens 6b in the relay lens system 6 is moved in the optical axis direction in accordance with the quantity of the thickness error of the transparent substrate 8b so that the incident light on the objective lens 7 becomes the convergence light.

However, when the sphere aberration generated due to the thickness error of the transparent substrate 8b is corrected, the incident light on the objective lens 7 is convergent or divergent so that a beam diameter being incident on an opening of the objective lens 7 changes. The Inventors of the present invention aim at the change of the beam diameter at the opening of the objective lens 7.

When the sphere aberration according to the thickness error of the transparent substrate 8b is corrected, the light quantity outputted from the objective lens 7 changes in accordance with a corrected quantity of the sphere aberration even when a light emission intensity of the semiconductor laser light source 2 is fixed. Moreover, the light-gathering beam form also changes. At this time, the light quantity for irradiating the recording/reproducing surface 8a of the optical disk 8 changes so that recording on the recording/reproducing surface or reproduction from the recording/reproducing surface becomes more difficult.

Here, the present invention provides a structure of an optical system in which the quantity of the incident light on the opening of the objective lens 7 does not change or slightly changes even when the bottom lens 6a and the top lens 6b move in the optical axis direction making the incident light on the objective lens 7 into the convergence light or the divergence light.

Figure 2A:
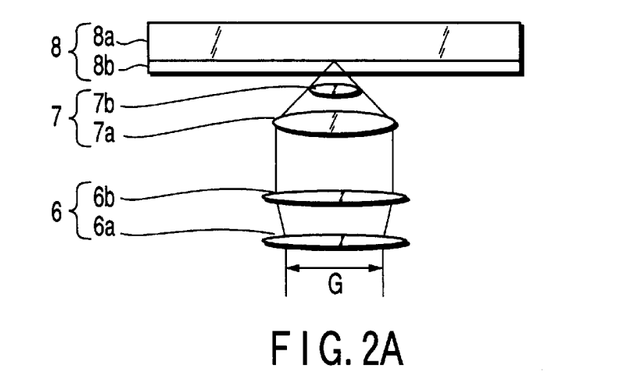
FIGS. 2A–2C are drawings for explaining a relay lens system arrangement and an objective lens incident light in consideration of correction of sphere aberration due to a thickness error of a transparent substrate of an optical disk.
Figure 2B:
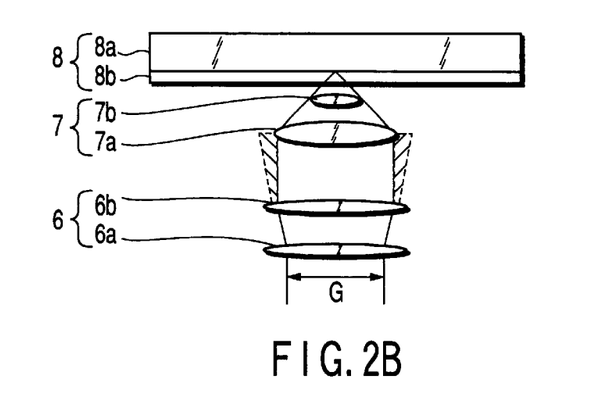
Figure 2C:
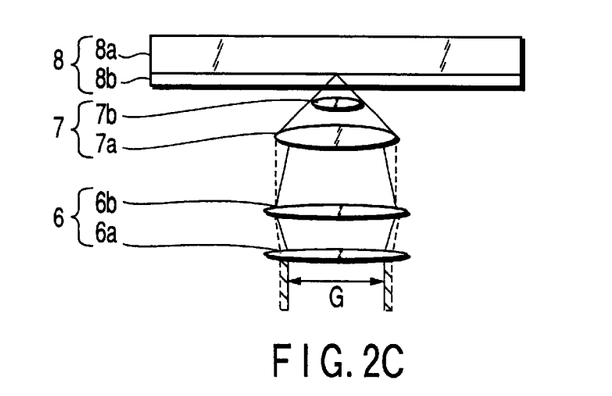

FIGS. 2A to 2C show position relations among the bottom lens 6a, the top lens 6b, and the objective lens 7 and the incident light on the objective lens 7 in consideration of only correction of the sphere aberration due to the thickness error of the transparent substrate 8b. FIG. 2A shows a case where the thickness of the transparent substrate 8b is equal to the specified value, FIG. 2B shows a case where the thickness of the transparent substrate 8b is more than the specified value, and FIG. 2C shows a case where the thickness of the transparent substrate 8b is less than the specified value.

As shown in FIG. 2A, when the thickness of the transparent substrate 8b is equal to the specified value, a light of a light quantity G being effective for designing is precisely incident on the opening of the objective lens 7. However, when the transparent substrate 8b is thicker than the specified value, the relay lens system 6 is controlled and the light is made into the divergence light. As a result, as shown in FIG. 2B, a part of the light of the light quantity G being effective for designing (the light of the part with diagonal lines) is located outside the opening of the objective lens 7 so that it is not used effectively. This means that the light quantity of the light irradiated on the recording/reproducing surface 8a of the disk is insufficient. On the contrary, when the transparent substrate 8b is thinner than the specified value, the relay lens system 6 is controlled and is made into the convergence light. As a result, as shown in FIG. 2C, excessive light besides the light quantity G being effective for designing (the light of the part with diagonal lines) is incident on the opening of the objective lens 7. This means that the light quantity of the light irradiated on the recording/reproducing surface 8a of the disk excesses.

When the irradiating light on the recording/reproducing surface 8b becomes insufficient or excessive in accordance with the thickness of the transparent substrate 8b as described above, it means a recording signal or a read-out signal becomes unstable.

Here, the present invention is to control the light quantity being incident on the opening of the objective lens 7 so that it does not fluctuate in accordance with the thickness of the transparent substrate 8b.

Figure 3A:
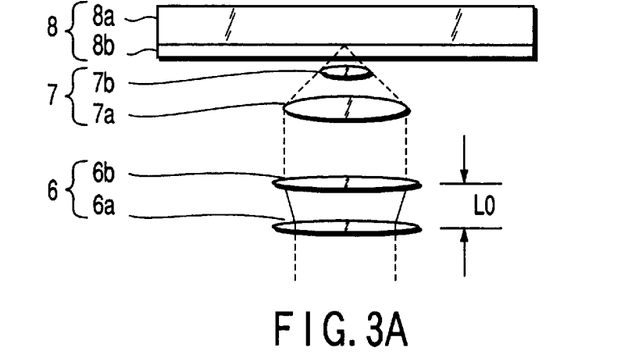
FIGS. 3A–3C are drawings for explaining the relay lens system arrangement and the objective lens incident light in consideration of the correction of the sphere aberration due to the thickness error of the transparent substrate of the optical disk and an objective lens incident beam diameter.
Figure 3B:
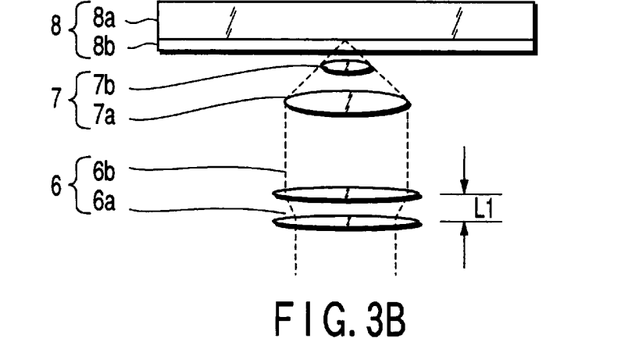
Figure 3C:
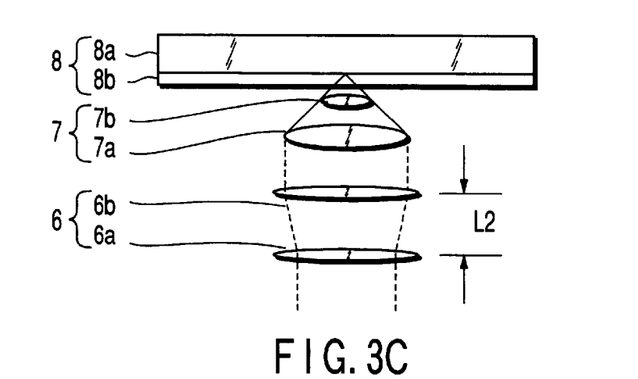

FIGS. 3A to 3C are shown for explaining a basic structure of the present invention.

FIGS. 3A to 3C show the position relations among the bottom lens 6a, the top lens 6b, and the objective lens 7 and the incident light on the objective lens in consideration of the correction of the sphere aberration and the change of the quantity of the incident light on the opening of the objective lens 7.

FIG. 3A shows a case where the thickness of the transparent substrate 8b is equal to the specified value, FIG. 3B shows a case where the thickness of the transparent substrate 8b is more than the specified value, and FIG. 3C shows a case where the thickness of the transparent substrate 8b is less than the specified value. The parts with diagonal lines in FIGS. 3A, 3B, and FIG. 3C are areas in which the light is incident on the opening of the objective lens 7, and it is recognized that the quantity of the incident light does not change in the respective cases.

Figure 4:
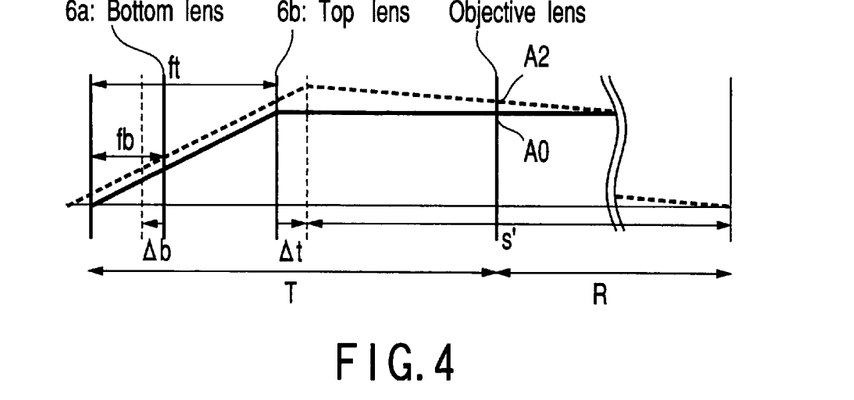
FIG. 4 is a drawing for explaining a principle in the first embodiment of the present invention.

FIG. 4 is shown for explaining the principle of the present invention. At first, the bottom lens 6a and the top lens 6b are approximated with a thin lens. Moreover, a focal point distance of the top lens 6b is described as $f_t$, a position movement quantity of the bottom lens 6a while the thickness error from the specified value of the thickness of the transparent substrate is corrected is described as $\Delta_b$, a position movement quantity of the top lens 6b is described as $\Delta_t$, and an image position while the bottom lens 6a and the top lens 6b move is described as s'. At the time, the reference numeral s' meets the following equation in accordance with the Gauss' formula.

$$\frac{1}{s'} = -\frac{1}{f_t + \Delta_b + \Delta_t} + \frac{1}{f_t} \quad (1)$$

Moreover, if the distance between an object point of the top lens 6b (equivalent to the focal point) and the objective lens 7 is described as T, a beam height while the incident light on the objective lens becomes a parallel light is described as $A_0$, the beam height $A_2$ at the object lens position when the bottom lens 6a and the top lens 6b are moved is described by the following equation.

$$A_2 = \frac{\Delta_b + \Delta_t}{f_t^2}\left(\frac{f_t^2}{\Delta_b + \Delta_t} + 2f_t - T + \Delta_t\right)A_0 \quad (2)$$

Here, differentiating the equation (2) with the $\Delta_b$ and $\Delta_t$ leads the following equation.

$$\frac{\partial A_2}{\partial \Delta_b} = \frac{2f_t - T}{f_t^2}A_0 \quad (3)$$

$$\frac{\partial A_2}{\partial \Delta_t} = \frac{2f_t - T + \Delta_b + 2\Delta_t}{f_t^2}A_0 \quad (4)$$

Here, when $T=2 f_t$ is met by the equation (3), that is, the distance between the top lens 6b and the objective lens 7 meets the $f_t$, the beam height $A_2=A_n$ at the objective lens position is fixed even when the bottom lens 6a is moved. That is, even when the bottom lens 6a is moved, the beam diameter of the incident light on the objective lens does not change. On the other hand, when the top lens 6b is moved by the equation (4), the beam height $A_2$ at the objective lens position is changed in accordance with the movement quantity $\Delta_t$. That is, if the top lens 6b is moved, the beam diameter of the incident light on the objective lens changes.

Next, there is acquired a condition under which the change of the beam diameter of the incident light on the objective lens is small when the top lens 6b is moved. Differentiating the equation (4) with $\Delta_t$ leads the following equation.

$$\frac{\partial A_2}{\partial A_t^2} = \frac{2}{f_t^2}A_0 \quad (5)$$

Here, when $f_t>0$, $\partial^2 A_2/\partial \Delta_t^2>0$ and $A_2$ has the minimal value.

Here, if the maximum movement position is at $\Delta_{t+}$, $\Delta_{t-}$, and $\Delta_{t+}=\Delta_{t-}$ when the top lens 6b is moved, the change of the beam diameter of the incident light on the objective lens becomes minimum when $T=2f_t$ is met, that is, when the distance between the top lens 6b and the objective lens 7 meets $f_t$, and the maximum value of the change quantity of the beam diameter of the incident light is described by the following equation by the equation (2).

$$A_2 = \left(1 + \frac{\Delta_t^2}{f_t^2}\right)A_0 \quad (6)$$

As above, when the bottom lens 6a is moved, the beam diameter of the incident light on the objective lens does not change when $T=2 f_t$ is met. On the other hand, in the case where the top lens 6b is moved, the change of the beam diameter of the incident light on the objective lens position becomes minimum when $T=2f_t$ is met, and the maximum change quantity is given by the equation (6).

Moreover, in the case where the bottom lens 6a is moved, when the movement quantity of the bottom lens 6a while the thickness error from the specified value of the thickness of the transparent substrate is corrected is described as $\Delta_b^M$, and the image point position of the incident light on the objective lens 7 at the time is described as R, the following equation is met.

$$R = \frac{f_t^2}{\Delta_b^M} \quad (7)$$

This leads the following equation.

$$f_t = \sqrt{\Delta_b^M R} \quad (8)$$

Or the following equation is led.

$$\Delta_b^M = \frac{f_t^2}{R} \quad (9)$$

Moreover, in the case where the top lens 6b is moved, when the movement quantity of the top lens 6b while the thickness error from the specified value of the thickness of the transparent substrate is corrected is described as $\Delta_t^M$, and the image point position of the incident light on the objective lens 7 at the time is described as R, the following equation is met.

$$R = \frac{f_t^2}{\Delta_t^M} + \Delta_t^M \quad (10)$$

This leads the following equation.

$$f_t = \sqrt{\Delta_b^M(R - \Delta_b^M)} \quad (11)$$

Or the following equation is led.

$$\Delta_b^M = \frac{R - \sqrt{R^2 - 4f_t^2}}{2} \quad (12)$$

Or $$\Delta_b^M = \frac{R + \sqrt{R^2 - 4f_t^2}}{2} (\Delta_b^M < 0) \quad (12)$$

When these relations in the above equations are met, the beam diameter being incident on the opening of the objective lens 7 has no change or has a slight change. Owing to this, it is recognized that the output light quantity from the objective lens 7 or the light-gather spot diameter does not change or slightly changes even when the bottom lens 6a or the top lens 6b moves in the optical axis direction.

Figure 9:
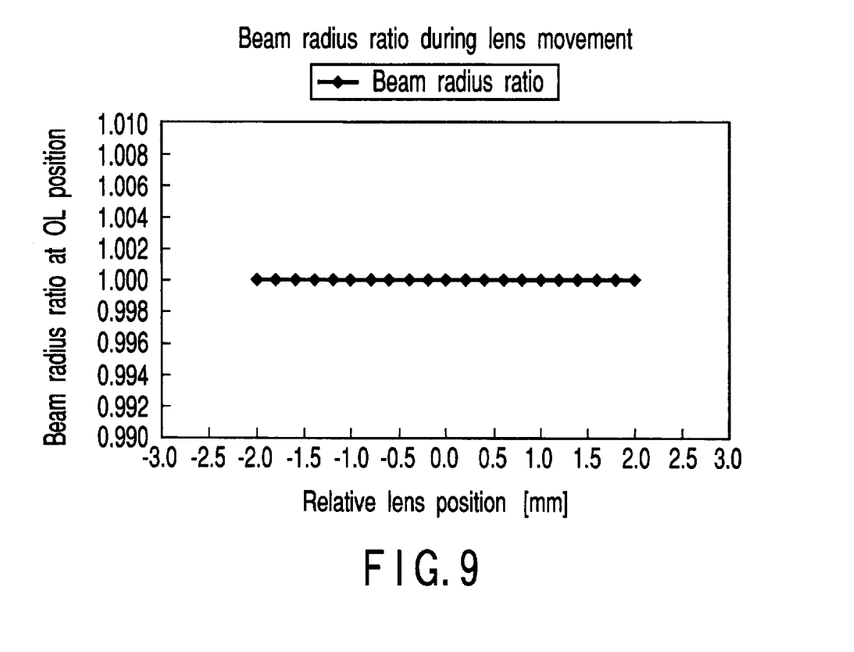
FIG. 9 is a drawing showing a graph in which an effect of bottom lens movement in the first embodiment of the present invention is acquired by paraxial approximation.
Figure 10:
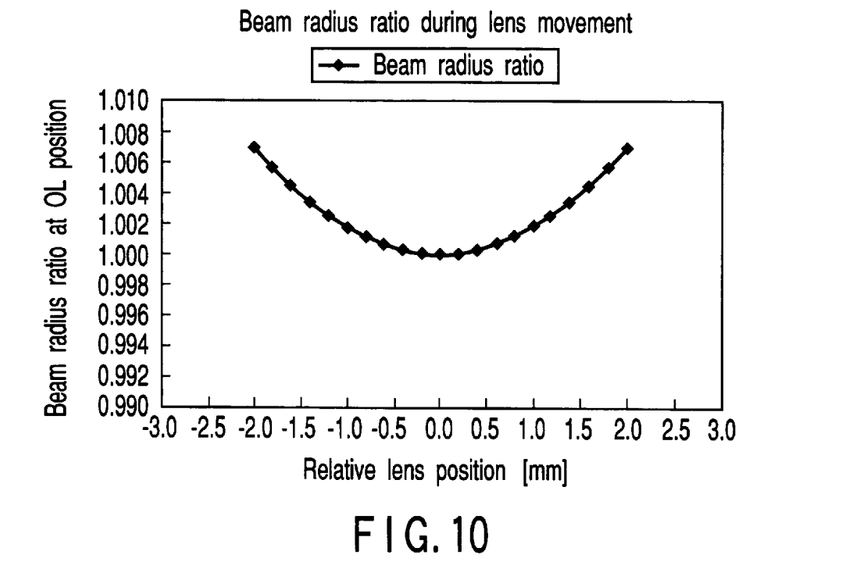
FIG. 10 is a drawing showing a graph in which an effect of top lens movement in the first embodiment of the present invention is acquired by the paraxial approximation.

FIG. 9 shows the fluctuation quantity of the beam diameter of the incident light on the objective lens 7 when the bottom lens 6a moves in the optical axis direction. Moreover, FIG. 10 shows the fluctuation quantity of the beam diameter of the incident light on the objective lens 7 when the top lens 6b moves in the optical axis direction.

A horizontal scale indicates relative lens positions, and a vertical axis indicates fluctuation ratios of the beam radius at the objective lens position.

Next, an explanation will be given with concrete numerals.

For example, it is assumed that, in FIG. 1, a number of the openings NA of the objective lens 7 is 0.85, the focal distance is 1.765 (mm), the incident light on the objective lens 7 is the substantially parallel light, and the specified value of the thickness of the transparent substrate 8b of the optical disk 8 is 0.1 (mm). It is assumed that there is an apparatus in which recording or reproduction of information on the optical disk 8 can normally be acquired under these conditions.

When the optical disk 8 with the thickness of the transparent substrate 8b being, for example, 0.08 (mm) is applied to the above-mentioned apparatus, the sphere aberration is generated on the recording/reproducing surface 8a on which the light is gathered.

Concretely, an optical path of the light at a center part of the objective lens is longer than that at a circumferential portion of the objective lens by several (μm). Contrarily, by making the incident light on the objective lens 7 into not the parallel light but the convergence light, the optical path of the light at the center part of the objective lens becomes shorter than that at the circumferential portion of the objective lens. In order to shorten the optical path of about several (μm) on the recording/reproducing surface 8a on which the light is gathered, it is sufficient to set the image point position R of the incident light on the objective lens 7 to, for example, about 285 (mm). That is, if the image point position R of the incident light on the objective lens 7 is set to about 285 (mm), the sphere aberration of the optical disk 8 with the thickness of the transparent substrate 8b of 0.08 (mm) can be corrected.

Here, when the distance between the position of the top lens 6b and the objective lens 7 is 24 (mm), the change of the beam diameter of the incident light on the position of the objective lens becomes the minimum when $f_t$=24 (mm), and the maximum movement quantity of the top lens 6b at this time becomes 2 (mm) according to the equation (12).

Accordingly, in order to correct the error in a range of ±0.02 (mm) of the thickness of the transparent substrate 8b, the top lens 6a requires the movement range of ±2 (mm). Moreover, if the focal point distance of the bottom lens 6a is 19.1 (mm), a magnification ratio by the relay lens system 6 becomes 1.25. Concerning the position relation between the relay lens system 6 and the objective lens 7 at the time, the distance between the bottom lens 6a and the top lens 6b becomes 4.9 (mm) and the distance between the top lens 6b and the objective lens 7 becomes 24 (mm) for the optical disk 8 whose thickness of the transparent substrate 8b is equal to the specified value.

Figure 11:
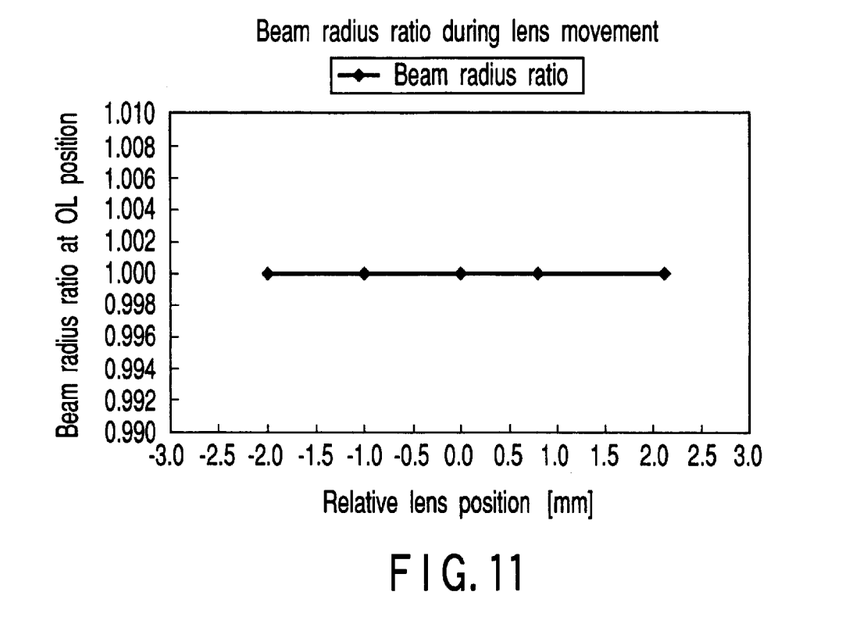
FIG. 11 is a drawing showing a graph in which the effect of the bottom lens movement in the first embodiment of the present invention is acquired by ray tracing.
Figure 12:
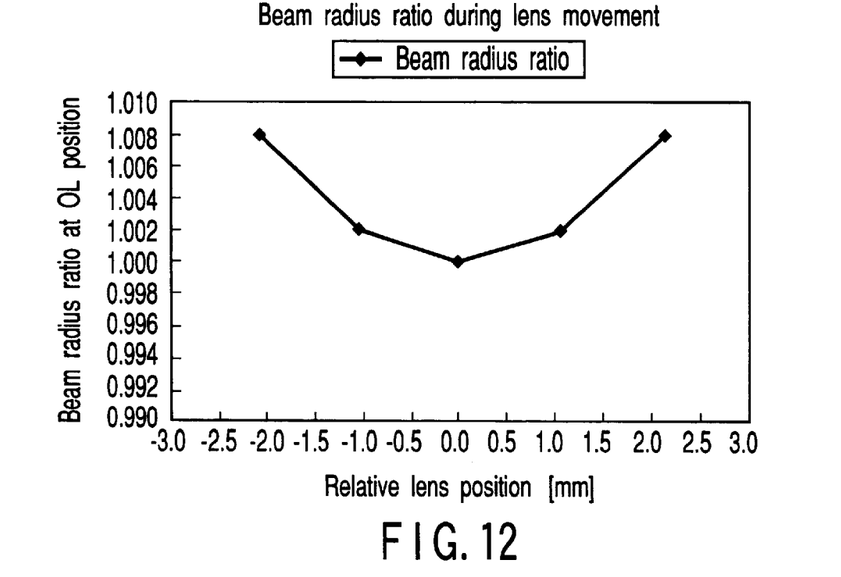
FIG. 12 is a drawing showing a graph in which the effect of the top lens movement in the first embodiment of the present invention is acquired by the ray tracing.

Here, FIGS. 11 and 12 show a fluctuation quantity of the beam diameter acquired by ray tracing after implementing optical design on the basis of the calculation of paraxial approximation.

FIG. 11 shows the fluctuation quantity of the beam diameter at the objective lens position when the bottom lens moves in the optical axis direction, and FIG. 12 shows the fluctuation quantity of the beam diameter at the objective lens position when the top lens moves in the optical axis direction. This shows that the fluctuation quantity of the beam diameter is suppressed sufficiently small.

Here, if the distance between the position of the top lens 6b and the objective lens 7 is 20 (mm), the change of the beam diameter of the incident light on the position of the objective lens becomes the minimum when $f_t$=20 (mm), and the maximum movement quantity of the top lens 6b at this time becomes 1.41 (mm) according to the equation (12).

Accordingly, in order to correct the error in a range of ±0.02 (mm) of the thickness of the transparent substrate, the top lens 6a requires the movement range of ±1.41 (mm). Moreover, if the focal point distance of the bottom lens 6a is 16 (mm), a magnification ratio by the relay lens system 6 becomes 1.25. Concerning the position relation between the relay lens system 6 and the objective lens 7 at the time, the distance between the bottom lens 6a and the top lens 6b becomes 4 (mm) and the distance between the top lens 6b and the objective lens 7 becomes 20 (mm) for the optical disk 8 whose thickness of the transparent substrate 8b is equal to the specified value.

This embodiment can widely be applied to the optical head for the optical disk with the transparent substrate, and the object optical recording/reproducing medium may be a reproduction-only optical disk, a photomagnetism disk, an optical card, and the like.

Next, an assembly error in an assembling step of the optical head will be considered.

In an actual assembling step of the optical head, it is difficult to meet the condition T=2 $f_t$ completely because a position error during assembling is generated. Here, it is assumed that an error quantity of the distance between the top lens 6b and the objective lens position is ΔT. At the time, T=2 $f_t$+ΔT is obtained. At first, the maximum value is acquired by the fluctuation of the beam diameter in the case where the position error exists when only the top lens 6b moves. At first, by substituting the equation T=2 $f_t$+ΔT to the equation (2), the following equation (13) can be acquired.

$$A_2 = \left(1 - \frac{\Delta_t(\Delta T - \Delta_t)}{f_t^2}\right)A_0 \quad (13)$$

Here, when the maximum movement position of the top lens 6b is $\Delta_{t+}$, the following equation (14) can be acquired according to the equations (6) and (13).

$$A_2 = \left(1 - \frac{\Delta_{t+}(\Delta T - \Delta_{t+})}{f_t^2}\right)A_0 \quad (14)$$

Moreover, when the maximum movement position of the top lens 6b is $\Delta_{t-}$, the following equation (15) can be acquired according to the equations (6) and (13).

$$A_2 = \left(1 - \frac{\Delta_{t-}(\Delta T - \Delta_{t-})}{f_t^2}\right)A_0 \quad (15)$$

According to the equations (14) and (15), the $A_2$ with a greater absolute value becomes the maximum value in either the equation (14) or (15) acquired by the reference numeral ΔT.

Next, the minimum value is acquired by the fluctuation of the beam diameter of the case where the position error exists. At first, by substituting T=2 $f_t$+ΔT to the equation (4), the $\Delta_t$ being the minimal value is acquired as $\Delta_t$=ΔT/2. By substituting this to the equation (13), the following equation (16) can be acquired.

$$A_2 = \left(1 - \frac{\Delta T^2}{4f_t^2}\right)A_0 \quad (16)$$

Here, the case where, for example, ΔT>0 will be considered. At the time, the $A_2$ of the equation (15) is greater in comparison with that of the equation (14) so that the maximum value of the $A_2$ is given by the equation (15).

Accordingly, by acquiring a fluctuation width by using the equations (15) and (16), the following equation (17) can be acquired.

$$\Delta A_2 = \left( \frac{\Delta_{t-}(\Delta T - \Delta_{t-})}{f_t^2} - \frac{\Delta T^2}{4 f_t^2} \right) A_0 \quad (17)$$

If the fluctuation width of the beam diameter is allowed up to $\Delta W$, the following equation (18) can be acquired by solving the equation (17) about $\Delta T$.

$$\Delta T = -R + \sqrt{R^2 - 4 f_t^2} + 2 f_t \sqrt{\Delta W} \quad (18)$$

Concerning the optical head that is actually assembled, it is sufficient that the fluctuation width of the beam diameter is within about 3% considering the stability during recording/reproduction. According to this, if the fluctuation width of the beam diameter is allowed up to, for example, 3%, it is sufficient that the following equation is met by using the equation (18).

$$\Delta T \le -R + \sqrt{R^2 - 4 f_t^2} + 2 f_t \sqrt{0.03} \quad (19)$$

In reality, the objective lens 7 moves by a focus control. At the time, the distance between the top lens 6b and the position of the objective lens 7 fluctuates. If the displacement range by the focus control is $\pm F_0$, the following equation is met.

$$A_2 = \left( 1 - \frac{\Delta_b \Delta T}{f_t^2} \right) A_0 \quad (21)$$

Next, the maximum and the minimum values are acquired by the fluctuation of the beam diameter of the case where the position error exists when only the bottom lens 6a moves. At first, by substituting $T = 2 f_t + \Delta T$ to the equation (2), the following equation (21) can be acquired.

$$A_2 = \left( 1 - \frac{\Delta_{b+} \Delta T}{f_t^2} \right) A_0 \quad (22)$$

Here, the consideration will be given of the case where, for example, $\Delta T > 0$. When the maximum movement position of the bottom lens 6b is $\Delta_{b+}$, the following equation (22) can be acquired.

$$\Delta T \le -R + \sqrt{R^2 - 4 f_t^2} + 2 f_t \sqrt{0.03} - F_0 \quad (20)$$

Here, the equation (23) can be acquired according to the equations (7) and (22).

$$A_2 = \left( 1 - \frac{\Delta T}{R} \right) A_0 \quad (23)$$

By acquiring the fluctuation width according to this, the following equation (24) can be acquired.

$$\Delta A_2 = \frac{2 \Delta T}{R} A_0 \quad (24)$$

If the fluctuation width of the beam diameter is allowed up to $\Delta W$, the following equation (25) can be acquired by solving the equation (24) about $\Delta T$.

$$\Delta T = \frac{R \Delta W}{2} \quad (25)$$

Concerning the optical head that is actually assembled, it is sufficient that the fluctuation width of the beam diameter is within about 3% considering the stability during recording/reproduction. According to this, if the fluctuation width of the beam diameter is allowed up to, for example, 3%, it is sufficient that the following equation is met by using the equation (25).

$$\Delta T \le \frac{0.03 R}{2} \quad (26)$$

In reality, the objective lens 7 moves by a focus control. At the time, the distance between the top lens 6b and the position of the objective lens 7 fluctuates. If the displacement range by the focus control is $\pm F_0$, the following equation is met.

$$\Delta T \le \frac{0.03 R}{2} - F_0 \quad (27)$$

Here, the case where, for example, only the top lens 6b moves will be considered. When $f_t = 24$ (mm), $R = 285$ (mm), and $F0 = 0.5$ (mm), the following equation is met according to the equation (20), and an error tolerance limit of the distance between the top lens 6b and the position of the objective lens becomes $\pm 3.69$ (mm).

$$|\Delta T| \le 3.69 \, [\text{mm}] \quad (28)$$

As mentioned above, basically in this embodiment, when the focal point distance of the lens at the objective lens side in the relay lens system is $f_t$, and the distance between the object point position of the incident light on the lens at the objective lens side and the objective lens is T, it can be said that the objective lens incident light quantity holding means meets $T = 2 f_t$.

Moreover, in the present invention, when the focal point distance of the relay lens at the objective lens side in the relay lens system is $f_t$, the distance between the object point position of the incident light on the relay lens at the objective lens side and the objective lens is T, and the image point position of the incident light of the objective lens is R, it can be said that the objective lens incident light quantity stabilizing means of the case where the relay lens at the semiconductor laser side is moved in order to correct the maximum thickness error of the transparent substrate meets the following equation when the fluctuation width of the beam diameter of 3% is allowed.

$$2 f_t - \frac{0.03}{2} R \le T \le 2 f_t + \frac{0.03}{2} R$$

Moreover, by considering in accordance with the equation (19), when the focal point distance of the relay lens at the objective lens side in the relay lens system is $f_t$, the distance between the object point position of the incident light on the relay lens at the objective lens side and the objective lens is T, and the image point position of the incident light of the objective lens is R, it can be said that the objective lens incident light quantity stabilizing means of the case where the relay lens at the semiconductor laser side is moved in order to correct the maximum thickness error of the transparent substrate meets the following equation.

$$2f_t + R - \sqrt{R^2 - 4f_t^2} - 2f_t\sqrt{0.03} \leq$$
$$T \leq 2f_t - R + \sqrt{R^2 - 4f_t^2} + 2f_t\sqrt{0.03}$$

This embodiment can widely be applied to the optical head for the optical disk output with the transparent substrate, and the object optical recording/reproducing medium may be a reproduction-only optical disk, a photomagnetism disk, an optical card, and the like.

Various methods can be used for sustaining the diameter of the incident light on the objective lens. A control signal is given to a control portion when the collimate lens (the top lens or the bottom lens) is moved for the sphere aberration correction, so the control signal is converted and a movement control quantity is monitored. Then, in accordance with the movement quantity, the bottom lens or the top lens (or a chassis at the light source side may be controlled as described in FIG. 7 below) is movement-controlled by a value that is previously calculated in order to sustain the beam diameter at the objective lens.

The present invention is not limited to the above-mentioned embodiment.

Figure 5:
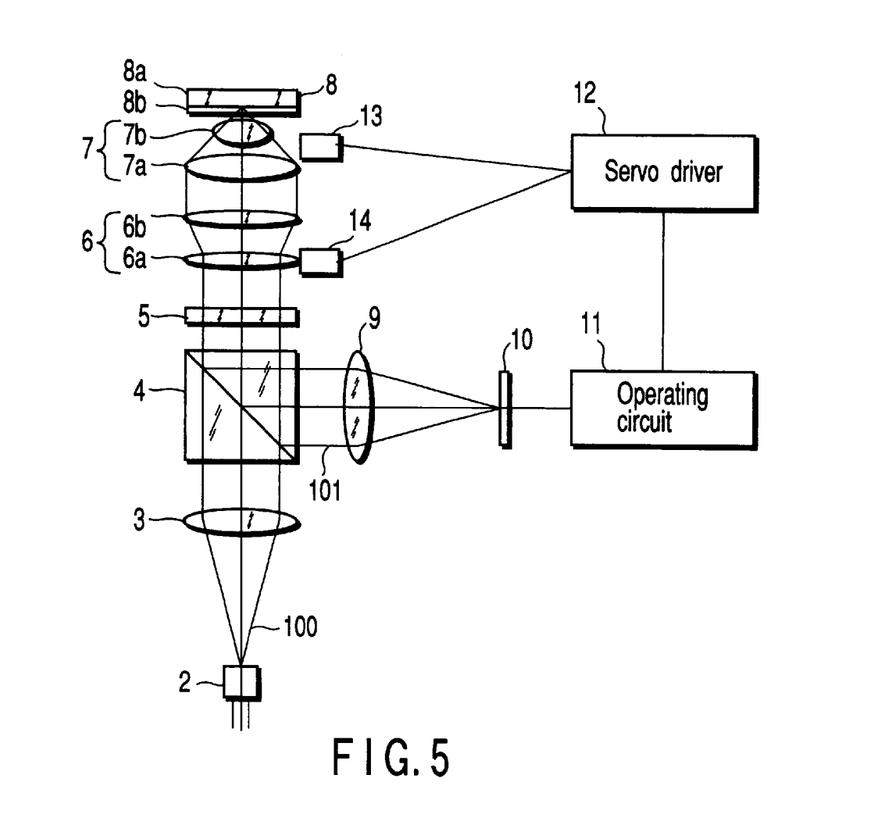
FIG. 5 is an explanatory drawing of a basic structure of an optical head according to a second embodiment of the present invention.

FIG. 5 is a drawing for explaining an optical head according to a second embodiment of the present invention. An output light 100 from a semiconductor laser light source 2 becomes a parallel light through a collimate lens 3 and permeates a polarized beam splitter 4 and a λ/4 plate 5. Then it permeates a relay lens system 6, and then becomes incident on an objective lens 7. Then, it permeates a transparent substrate 8b of an optical disk 8, and is gathered on a recording/reproducing surface 8a. A reflection light 101 from the recording/reproducing surface 8a of the optical disk 8 re-permeates the transparent substrate 8b of the optical disk 8, permeates the objective lens 7, the relay lens system 6, and the λ/4 plate 5, and is reflected on the polarized beam splitter 4. Then, it permeates a light detection system 9, and becomes incident on a light detector 10.

A light-receiving portion of the light detector 10 is normally divided into plural parts, and each of divided areas of the light-receiving portion outputs a current according to a light intensity. After the outputted current is converted into a voltage by using an I/V amplifier (not shown), it is operation-processed into an HF signal, a focus error signal, a track error signal and the like by using an operating circuit 11.

Here, the relay lens system 6 comprises a bottom lens 6a and a top lens 6b, and the bottom lens 6b can be moved in the optical axis direction. A driving portion 14 executes the movement of the bottom lens.

Here, for example in FIG. 5, it is assumed that there is a structure in which the optical disk 8 with the thickness of the transparent substrate 8b being equal to the specified value of 0.1 (mm) can be record or reproduce when a number of the openings NA of the objective lens 7 is 0.85, the focal distance is 1.765 (mm), and the incident light on the objective lens 7 is the substantially parallel light. In this structure, if the image point position R of the incident light on the objective lens 7 is set to, for example, about 285 (mm), the sphere aberration of the optical disk 8 with the thickness of the transparent substrate 8b of 0.08 (mm) can be corrected.

Here, if the distance between the position of the top lens 6b and the objective lens 7 is 24 (mm), the change of the beam diameter of the incident light on the position of the objective lens becomes the minimum when $f_t$=24 (mm), and the maximum movement quantity of the bottom lens 6b at this time becomes 2 (mm) according to the equation (9).

Accordingly, in order to correct the error in a range of ±0.02 (mm) of the thickness of the transparent substrate, the bottom lens 6b requires the movement range of ±2 (mm). Moreover, if the focal point distance of the bottom lens 6a is 19.2 (mm), a magnification ratio by the relay lens system 6 becomes 1.25. Concerning the position relation between the relay lens system 6 and the objective lens 7 at the time, the distance between the bottom lens 6a and the top lens 6b becomes 4.8 (mm) and the distance between the top lens 6b and the objective lens 7 becomes 24 (mm) for the optical disk 8 whose thickness of the transparent substrate 8b is equal to the specified value.

Here, the fluctuation quantity of the beam diameter according to a calculation of the above-mentioned paraxial approximation is as shown in FIG. 9 above. FIG. 9 indicates that there is no fluctuation quantity of the beam diameter. Moreover, FIG. 11 shows the fluctuation quantity of the beam diameter acquired by ray tracing after implementing optical design on the basis of the calculation of the paraxial approximation. This indicates that the fluctuation quantity of the beam diameter has little change even during actual optical designing, and it is understood that the above-mentioned paraxial approximation calculation can be applied.

Moreover, considering the stability during recording/reproduction, when the movement range of the objective lens 7 by the focus control is ±0.5 (mm), $|\Delta T| \leq 3.78$ (mm) is met by using the equation (27) if the fluctuation width of the beam diameter is allowed up to 3%.

This embodiment can widely be applied to the optical head for the optical disk with the transparent substrate, and the object optical recording/reproducing medium may be a reproduction-only optical disk, a photomagnetism disk, an optical card, and the like.

Figure 6:
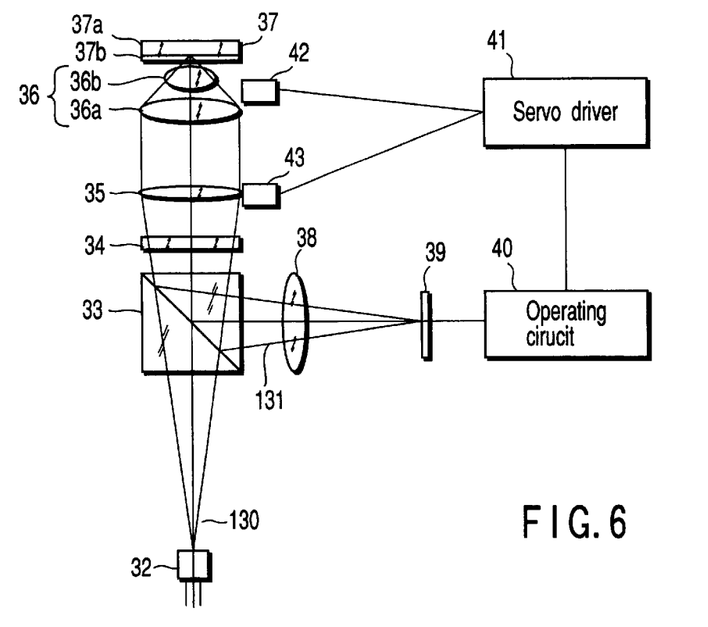
FIG. 6 is an explanatory drawing of a basic structure of an optical head according to a third embodiment of the present invention.

FIG. 6 further shows a main part of an optical head according to a third embodiment of the present invention. An output light 130 from a semiconductor laser light source 32 permeates a polarized beam splitter 33 and a λ/4 plate 34. Then it becomes incident on an objective lens 36 after permeating a collimate lens 35. Then, it permeates a transparent substrate 37b of an optical disk 37, and is gathered on a recording/reproducing surface 37a. A reflection light 131 from the recording/reproducing surface 37a of the optical disk 37 re-permeates the transparent substrate 37b of the optical disk 37, permeates the objective lens 36, the collimate lens system 35, and the λ/4 plate 34, and is reflected on the polarized beam splitter 33. Then, it permeates a light detection system 38, and becomes incident on a light detector 39.

A light-receiving portion of the light detector 39 is normally divided into plural parts, and each of divided areas of the light-receiving portion outputs a current according to a light intensity. After the outputted current is converted into a voltage by using an I/V amplifier (not shown), it is operation-processed into an HF signal, a focus error signal, a track error signal and the like by using an operating circuit 40.

Here, the collimate lens 35 can be moved in the optical axis direction. The movement of the collimate lens is executed by a driving portion 43.

For example in FIG. 6, it is assumed that there is a structure in which the optical disk 37 with the thickness of the transparent substrate 37b being equal to the specified value of 0.1 (mm) can be record or reproduce when a number of the openings NA of the objective lens 36 is 0.85, the focal distance is 1.765 (mm), and the incident light on the objective lens 36 is the substantially parallel light. In this structure, if the image point position R of the incident light on the objective lens 36 is set to, for example, about 285 (mm), the sphere aberration of the optical disk 37 with the thickness of the transparent substrate 37b of 0.08 (mm) can be corrected.

Here, if the distance between the position of the collimate lens 35 and the objective lens is 20 (mm), the change of the beam diameter of the incident light on the position of the objective lens becomes the minimum when $f_t$=20 (mm), and the maximum movement quantity of the top lens 6b at this time becomes 1.41 (mm) according to the equation (12).

Accordingly, in order to correct the error in a range of ±0.02 (mm) of the thickness of the transparent substrate, the collimate lens 35 requires the movement range of ±1.41 (mm).

This embodiment can widely be applied to the optical head for the optical disk with the transparent substrate, and the object optical recording/reproducing medium may be a reproduction-only optical disk, a photomagnetism disk, an optical card, and the like.

Figure 7:
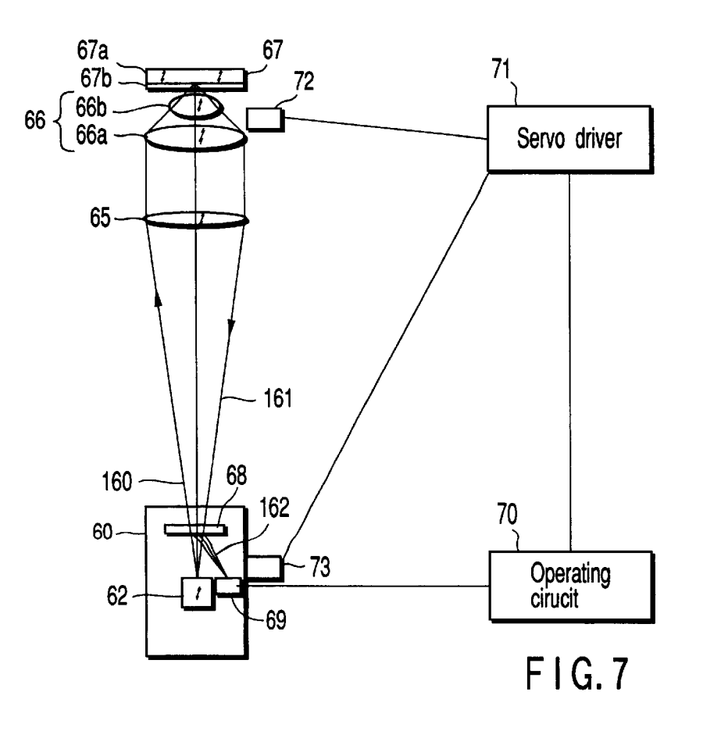
FIG. 7 is an explanatory drawing of a basic structure of an optical head according to a fourth embodiment of the present invention.

FIG. 7 shows a main part of an optical head according to a fourth embodiment of the present invention. An optical integrated element 60 carries a semiconductor laser light source 62, a light detector 69, a diffraction element 68, and the like on a chassis. The diffraction element 68 approximately permeates an output light (outward light) from the semiconductor laser light source 62, and diffracts an incident light (return light (reflection light from a disk) on the optical integrated element 60.

The diffraction element 68 is, for example, a normal diffraction grating or a polarization hologram. The output light from the semiconductor laser light source 62 permeates the diffraction element 68, and then, is outputted from the optical integrated element 60. An output light 160 from the optical integrated element 60 permeates a collimate lens 65, and then, becomes incident on an objective lens 66. Then, it permeates a transparent substrate 67b of an optical disk 37, and is gathered on a recording/reproducing surface 67a. A reflection light 161 from the recording/reproducing surface 67a of the optical disk 67 re-permeates the transparent substrate 67b of the optical disk 67, permeates the objective lens 66 and the collimate lens system 65, and becomes incident on the optical integrated element 60. The incident light on the optical integrated element 60 is diffracted by the diffraction element 68, and then becomes incident on a light detection system 69.

A light-receiving portion of the light detector 69 is divided into plural parts, and each of divided areas of the light-receiving portion outputs a current according to a light intensity. After the outputted current is converted into a voltage by using an I/V amplifier (not shown), it is operation-processed into an HF signal, a focus error signal, a track error signal and the like by using an operating circuit 70.

Here, the optical integrated element 60 can be moved in the optical axis direction. The driving portion 73 implements the movement of the optical integrated element 60. Various means such as a piezoelectric element or ultrasonic wave motor are possible.

Here, for example in FIG. 7, it is assumed that there is a structure in which the optical disk 67 with the thickness of the transparent substrate 68b being equal to the specified value of 0.1 (mm) can be record or reproduce when a number of the openings NA of the objective lens 36 is 0.85, the focal distance is 1.765 (mm), and the incident light on the objective lens 66 is the substantially parallel light. In this structure, if the image point position R of the incident light on the objective lens 66 is set to, for example, about 285 (mm), the sphere aberration of the optical disk 67 with the thickness of the transparent substrate 67b of 0.08 (mm) can be corrected.

Here, if the distance between the position of the optical integrated element 60 and the objective lens is 20 (mm), the change of the beam diameter of the incident light on the position of the objective lens becomes the minimum when $f_t$=20 (mm), and the maximum movement quantity of the optical integrated element 60 at this time becomes 1.40 (mm) according to the equation (12).

Accordingly, in order to correct the error in a range of ±0.02 (mm) of the thickness of the transparent substrate, the optical integrated element 60 requires the movement range of ±1.40 (mm). This embodiment can widely be applied to the optical head for the optical disk with the transparent substrate, and the object optical recording/reproducing medium may be a reproduction-only optical disk, a photomagnetism disk, an optical card, and the like.

Figure 8:
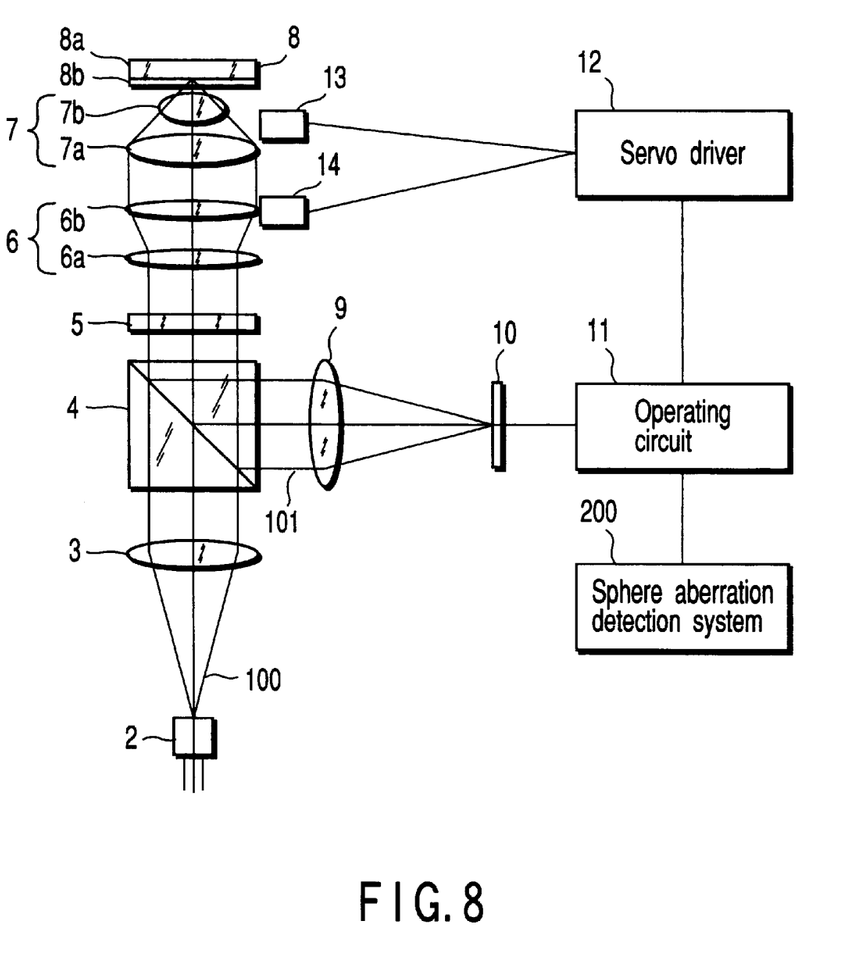
FIG. 8 is an explanatory drawing of a basic structure of an optical disk apparatus according to a fifth embodiment of the present invention.

FIG. 8 shows a main part of the optical head in the fourth embodiment of the present invention. A sphere aberration detection system 200 is further added to the optical head shown in FIG. 1. A light quantity outputted from the objective lens or a light-gathering spot form can be kept fixed without changing the beam diameter that is always incident on the objective lens by feedback-controlling the top lens position on the basis of a sphere aberration error signal acquired by the sphere aberration detection system 200.

In FIG. 8, when the thickness of the transparent substrate 8b is not equal to the specific value, it is sufficient that the bottom lens 6a or the top lens 6b in the relay lens system 6 is moved in the optical axis direction in accordance with the quantity of the thickness error of the transparent substrate 8b so that the incident light on the objective lens 7 will be a convergence light or a divergence light. At the time, it becomes necessary to detect the quantity of the sphere aberration generated in accordance with the quantity of the thickness error of the transparent substrate 8b or the quantity of the thickness error of the transparent substrate 8b itself. As a method of detecting the quantity of the sphere aberration generated in accordance with the quantity of the thickness error of the transparent substrate 8b, there is a method as disclosed in T. Shimano et al, Technical Digest ISOM2000 242–243 (2000). This utilizes the fact that the focal point positions of the sphere aberration are different at an inner circle and a circumferential portion of the beam, and according to this, for example, a beam division hologram and a light-gathering lens that are not shown in the figures are combined as the light detection system 9, the inner circle and the circumferential portion of the reflection light 101 by the recording/reproducing surface 8a of the optical disk 8 are divided by the beam division hologram, and the inner circle beam and the circumferential portion beam are incident on the light detector 10. The light-receiving portion of the light detector 10 is divided into plural parts, and each of the light-receiving portions outputs a current according to a light intensity. The outputted current is converted into a voltage by an I/V amplifier (not shown), and then operation-processed into the focus error signal from each of the inner circle beam and the circumferential portion beam by an operation circuit 11.

Then, the difference among the respective focus error signals is taken as the sphere aberration error signal. The sphere aberration detection system 200 shows these beam division hologram and operation process portion. On the basis of the sphere aberration error signal acquired by the sphere aberration detection system 200, the light quantity outputted from the bottom lens 6a or the objective lens 7 of the relay lens system 6 or the light-gathering spot form can be kept fixed.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An optical head comprising:

a laser light source for outputting a light beam;

an objective lens for gathering the light beam on a recording/reproducing surface of an optical disk having a transparent substrate;

a relay lens system comprising one or more lenses inserted between the laser light source and the objective lens;

means for movement-controlling the one or more lenses in the relay lens system toward its optical axis so as to correct sphere aberration in accordance with a thickness of the transparent substrate of the optical disk; and objective lens incident light quantity stabilizing means for sustaining a diameter of the incident light on the objective lens when one or more lenses among the relay lenses move, wherein, when a focal length of the relay lens at the objective lens side in the relay lens system is described as ft, and a distance between an object point of the incident light on the relay lens at the objective lens side and the objective lens is described as T, the objective lens incident light quantity holding means meets T=2 $f_t$.

2. The optical head according to claim 1, wherein, the relay lens system comprises one or more collimate lenses, and when a focal length of the collimate lens is described as ft, and a distance between an object point of the incident light on the collimate lens and the objective lens is described as T, T=2 $f_t$ is met.

3. The optical head according to claim 1 comprising:

means for detecting a thickness of the transparent substrate; and means for driving the relay lens system in accordance with the thickness of the transparent substrate.

4. The optical head according to claim 1, wherein, when a focal length of the relay lens at the objective lens side in the relay lens system is described as ft, a distance between an object point of an incident light on the relay lens at the objective lens side and the objective lens itself is described as T, and an image point of the incident light on the objective lens is described as R, the objective lens incident light quantity stabilizing means meets the following equation in order to correct the maximum error of the thickness of the transparent substrate.

$$2f_t - \frac{0.03}{2}R \le T \le 2f_t + \frac{0.03}{2}R$$

5. The optical head according to claim 1, wherein, when a focal length of the relay lens at the objective lens side in the relay lens system is described as ft, a distance between an object point of an incident light on the relay lens at the objective lens side and the objective lens itself is described as T, and an image point of the incident light on the objective lens is described as R, the objective lens incident light quantity stabilizing means meets the following equation in order to correct the maximum error of the thickness of the transparent substrate.

$$2f_t + R - \sqrt{R^2 - 4f_t^2} - 2f_t\sqrt{0.03} \le$$
$$T \le 2f_t - R + \sqrt{R^2 - 4f_t^2} + 2f_t\sqrt{0.03}$$

6. The optical head according to claim 1 comprising:

means for detecting a thickness of the transparent substrate; and means for driving the relay lens system in accordance with the thickness of the transparent substrate;

wherein, the relay lens system comprises one or more collimate lenses, and when a focal length of the collimate lens is described as ft, and a distance between an object point of the incident light on the collimate lens and the objective lens is described as T, T=2 ft is met.

7. The optical head according to claim 1, wherein, the relay lens system comprises one or more collimate lenses, and when a focal length of the collimate lens is described as ft, and a distance between an object point of the incident light on the collimate lens and the objective lens is described as T, T=2 $f_t$ is met, and an image point of the incident light on the objective lens is described as R, the objective lens incident light quantity stabilizing means meets the following equation in order to correct the maximum error of the thickness of the transparent substrate.

$$2f_t - \frac{0.03}{2}R \le T \le 2f_t + \frac{0.03}{2}R$$

8. The optical head according to claim 1, wherein, the relay lens system comprises one or more collimate lenses, and when a focal length of the collimate lens is described as ft, and a distance between an object point of the incident light on the collimate lens and the objective lens is described as T, T=2 $f_t$ is met, and an image point of the incident light on the objective lens is described as R, the objective lens incident light quantity stabilizing means meets the following equation in order to correct the maximum error of the thickness of the transparent substrate.

$$2f_t + R - \sqrt{R^2 - 4f_t^2} - 2f_t\sqrt{0.03} \le$$
$$T \le 2f_t - R + \sqrt{R^2 - 4f_t^2} + 2f_t\sqrt{0.03}$$

9. An optical head comprising:

a laser light source for outputting a light beam;

an objective lens for gathering the light beam on a recording/reproducing surface of an optical disk having a transparent substrate;

a relay lens system comprising one or more lenses inserted between the laser light source and the objective lens;

means for movement-controlling the one or more lenses in the relay lens system toward its optical axis so as to correct sphere aberration in accordance with a thickness of the transparent substrate; and objective lens incident light quantity stabilizing means for suppressing deviation of a diameter of the incident light on the objective lens when one or more lenses among the relay lenses move, wherein, when a focal length of the relay lens at the objective lens side in the relay lens system is described as ft, and a distance between an object point of the incident light on the relay lens at the objective lens side and the objective lens is described as T, the objective lens incident light quantity holding means meets T=2 $f_r$.

10. The optical head according to claim 9, wherein, the relay lens system comprises one or more collimate lenses, and when a focal length of the collimate lens is described as ft, and a distance between an object point of the incident light on the collimate lens and the objective lens is described as T, T=2 $f_t$ is met.

11. The optical head according to claim 9 comprising:
means for detecting a thickness of the transparent substrate; and
means for driving the relay lens system in accordance with the thickness of the transparent substrate.

12. The optical head according to claim 9, wherein, when a focal length of the relay lens at the objective lens side in the relay lens system is described as ft, a distance between an object point of an incident light on the relay lens at the objective lens side and the objective lens itself is described as T, and an image point of the incident light on the objective lens is described as R, the objective lens incident light quantity stabilizing means meets the following equation in order to correct the maximum error of the thickness of the transparent substrate.

$$2f_t - \frac{0.03}{2}R \le T \le 2f_t + \frac{0.03}{2}R$$

13. The optical head according to claim 9, wherein, when a focal length of the relay lens at the objective lens side in the relay lens system is described as ft, a distance between an object point of an incident light on the relay lens at the objective lens side and the objective lens itself is described as T, and an image point of the incident light on the objective lens is described as R, the objective lens incident light quantity stabilizing means meets the following equation in order to correct the maximum error of the thickness of the transparent substrate.

$$2f_t + R - \sqrt{R^2 - 4f_t^2} - 2f_t\sqrt{0.03} \le$$

-continued
$$T \le 2f_t - R + \sqrt{R^2 - 4f_t^2} + 2f_t\sqrt{0.03}$$

14. An optical disk apparatus comprising:
an optical integrated element having a laser light source for outputting a light beam;
an objective lens for gathering the light beam on a recording/reproducing surface of an optical disk having a transparent substrate;
a relay lens system comprising one or more lenses inserted between the laser light source and the objective lens;
means for movement-controlling the one or more lenses in the relay lens system toward its optical axis so as to correct sphere aberration in accordance with a thickness of the transparent; and
means for movement-controlling the optical integrated element in order to suppress fluctuation of a diameter of the incident light on the objective lens when one or more lenses among the relay lenses move.

15. An optical disk apparatus comprising:
an optical integrated element having a laser light source for outputting a light beam; an objective lens for gathering the light beam on a recording/reproducing surface of an optical disk having a transparent substrate;
a relay lens system comprising one or more lenses inserted between the laser light source and the objective lens;
first movement-controller which controls the one or more lenses in the relay lens system toward its optical axis so as to correct sphere aberration in accordance with a thickness of the transparent; and
second movement-controller which controls the optical integrated element in order to suppress fluctuation of a diameter of the incident light on the objective lens when one or more lenses among the relay lenses move.

* * * * *